(12) United States Patent
Theytaz et al.

(10) Patent No.: US 9,411,439 B2
(45) Date of Patent: Aug. 9, 2016

(54) INPUT DEVICE WITH A CUSTOMIZABLE CONTOUR

(71) Applicant: Logitech Europe S.A., Morges (CH)

(72) Inventors: Olivier Theytaz, Savigny (CH); Samuel Siegfried, Lausanne (CH); Joseph Lu, Morges (CH); Nicolas Ramond, Lugrin (FR); Nicolas Chauvin, Chexbres (CH); Marc Bidiville, Pully (CH)

(73) Assignee: Logitech Europe S.A., Lausanne (CH)

( * ) Notice: Subject to any disclaimer, the term of this patent is extended or adjusted under 35 U.S.C. 154(b) by 312 days.

(21) Appl. No.: 13/841,040

(22) Filed: Mar. 15, 2013

(65) Prior Publication Data

US 2014/0267040 A1 Sep. 18, 2014

(51) Int. Cl.
G06F 3/033 (2013.01)
G09G 5/08 (2006.01)
G06F 3/0354 (2013.01)
G06F 3/039 (2013.01)

(52) U.S. Cl.
CPC ............ *G06F 3/03543* (2013.01); *G06F 3/039* (2013.01)

(58) Field of Classification Search
CPC .............................. G06F 3/03543; G06F 3/039
See application file for complete search history.

(56) References Cited

U.S. PATENT DOCUMENTS

| | | | | |
|---|---|---|---|---|
| 6,431,504 B1* | 8/2002 | Ignagni | ............... | G06F 3/03543 248/118 |
| 2002/0180693 A1* | 12/2002 | Muir | .................. | G06F 3/03543 345/156 |
| 2007/0242046 A1* | 10/2007 | Weiss | .................. | G06F 3/03543 345/163 |
| 2009/0090706 A1* | 4/2009 | Li | ....................... | G06F 3/03543 219/482 |

FOREIGN PATENT DOCUMENTS

CN 101788859 A * 1/2010
CN 101788859 A * 7/2010

\* cited by examiner

*Primary Examiner* — Andrew Sasinowski
*Assistant Examiner* — Brent D Castiaux
(74) *Attorney, Agent, or Firm* — Kilpatrick Townsend & Stockton LLP

(57) ABSTRACT

Certain embodiments of the invention include an input device (e.g., a computer mouse) including a processor, a housing including a top side, the housing configured to support a user's hand, and a detachable cover plate configured to attach to the top side of the housing and support a user's hand. The cover plate can include a shape memory polymer (SMP) disposed thereon, where the SMP is pliable and operable to conform to the user's hand when a temperature of the SMP is at or above a threshold value. Furthermore, the SMP can be firm and non-conforming when the temperature of the SMP falls below the threshold value. A heating unit controlled by the processor can be configured to control the temperature of the shape memory polymer. The detachable cover plate can include the shape memory polymer disposed in areas configured to contact a user's palm and thumb.

9 Claims, 10 Drawing Sheets

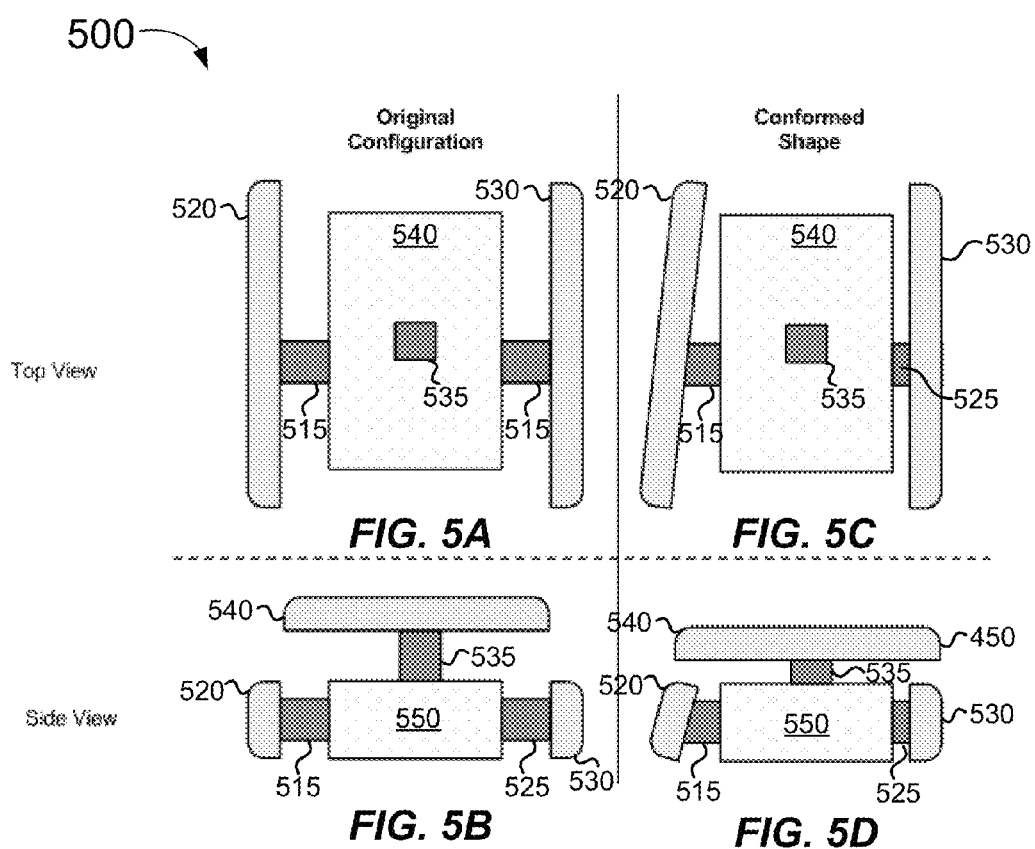

1100

INPUT DEVICE WITH A CUSTOMIZABLE CONTOUR

BACKGROUND

Input devices are ubiquitous in modern culture and are typically used to convert analog inputs (e.g., touches, clicks, motions, gestures, etc.) into digital signals for computer processing. An input device can include any peripheral (i.e., piece of computer hardware equipment) used to provide data and control signals to an information processing system such as a computer or other information appliance. Some examples of hand held input devices include computer mice, remote controls, gaming controllers, and the like.

Input devices, such as computer mice, are conventionally designed for universal application. For example, different users may have different sized hands or left/right hand preferences, different design requirements, and different functional preferences. Thus, many manufacturers strive for one-size-fits-all designs to appeal to the greatest number of customers. Some manufacturers may offer specialized mice featuring certain specialty contours, features, and dimensions to appease the more discerning customers. However, customers are limited to the available designs, which may not satisfy their particular ergonomic preferences. Furthermore, multiple users of a single input device may not have similar preferences, leaving some users to use other preferred input devices or settle for ill-suited designs.

BRIEF SUMMARY

Certain embodiments of the invention include an input device (e.g., a computer mouse) including a processor, a housing including a top side, the housing configured to support a user's hand, and a detachable cover plate configured to attach to the top side of the housing and support a user's hand. The cover plate can include a shape memory polymer (SMP) disposed thereon, where the SMP is pliable and operable to conform to the user's hand when a temperature of the SMP is at or above a threshold value. Furthermore, the SMP can be firm and non-conforming when the temperature of the SMP falls below the threshold value. A heating unit controlled by the processor can be configured to control the temperature of the shape memory polymer. The detachable cover plate can include the shape memory polymer disposed in areas configured to contact a user's palm and thumb.

In some embodiments, an input device includes a processor, a housing including a top side, a left side, and a right side, the housing configured to support a user's hand, and one or more conformable regions disposed on one or more of the top side, left side, and right side of the housing, each conformable region operable to be reshaped in response to an applied pressure. Each of the one or more conformable regions can be comprised of a shape memory polymer (SMP), where the SMP is operable to be reshaped in response to the applied pressure when a temperature of the SMP is at or above a threshold value, and the SMP being firm and non-conforming in response to the applied pressure when the temperature of the SMP falls below the threshold value. In some cases, a heating unit controlled by the processor can be configured to control the temperature of the shape memory polymer. In some cases, each of the one or more conformable regions can be comprised of vacuum-bagged micro-balls.

In some embodiments, the vacuum bagged micro-balls can include an elastic pocket, a plurality of micro-balls disposed inside the elastic pocket, a micropump configured to pump air into the elastic pocket and vacuum pump air out of the elastic pocket, and one or more valves configured between the micropump and the elastic pocket. The one or more valves can be operable to open to allow air to pass between the micropump and the elastic pocket, and close to seal the air within the elastic pocket. In some cases, the one or more valves are controlled by the processor, where the vacuum bagged micro-balls are operable to be reshaped by the applied pressure when air is pumped into the elastic pocket, and where the vacuum bagged micro-balls are non-conforming when air is vacuum pumped out of the elastic pocket. In certain embodiments, each of the vacuum bagged micro-balls can comprise a top portion and a bottom portion, the bottom portion being rigid and providing the general shape of the input device, and the top side covered by a flexible rubber or gel layer to reduce a bumpiness provided by the micro-balls.

In some embodiments, the one or more conformable regions can include an array of mechanical pistons, each of the pistons depressible over a range of motion including a fully extended position and a fully compressed position, a locking mechanism configured to lock each piston of the array of pistons in a position within the range of motion, and an elastic skin disposed over the plurality of depressible pistons. The elastic skin can be operable to link the array of depressible pistons together, and smooth out a topology of the array of pistons. Each piston of the array of pistons can include a spring mechanism to return the piston to the fully extended position in the absence of the applied pressure, and wherein the locking mechanism is a locking blade that, when activated, causes each piston of the array of pistons to lock into their current position. Activating the processor can be configured to control activating the locking blade.

In some cases, the one or more conformable regions include an elastic pocket filled with a magnetoreostatic fluid, and a magnetic and conductive sponge disposed within the elastic pocket, where the conductive sponge operable to conduct an electric current and to create a magnetic field in response to the electric current. The magnetoreostatic fluid can be firm and non-conforming in the presence of the magnetic field, and the magnetoreostatic fluid can be pliable and conformable in the absence of the magnetic field. In certain aspects, the conductive sponge includes a plurality of conductive wires, the processor controls the electric current, and input device is a computer mouse.

In further embodiments, a method of customizing a conformable region on an input device includes injecting a gas into an elastic pocket, where the elastic pocket coupled to the input device and including a plurality of micro-balls disposed therein, and where the elastic pocket is at least a portion of the conformable region. The method can further include receiving, on the elastic pocket, an applied pressure, where the elastic pocket is operable to be reshaped in response to the applied pressure when the gas is present inside the elastic pocket. The method can further include vacuum pumping the gas out of the elastic pocket, where the elastic pocket being firm and non-conforming when the gas is not present inside the elastic pocket. In some cases, the method further includes opening a valve to allow air to pass from a micropump into the elastic pocket, and closing the valve to seal the gas inside the elastic pocket. Vacuum pumping the gas out of the elastic pocket can further include opening a valve to allow air to pass out of the elastic pocket thereby creating a vacuum inside the elastic pocket, and closing the valve to maintain the vacuum inside the elastic pocket.

BRIEF DESCRIPTION OF THE DRAWINGS

FIG. 5A is a simplified diagram of a top view of an input device with adjustable body panels, according to an embodiment of the invention.

FIG. 5B is a simplified diagram of a side view of an input device with adjustable body panels, according to an embodiment of the invention.

FIG. 5C is a simplified diagram of a top view of an input device with adjustable body panels configured in a customized configuration, according to an embodiment of the invention.

FIG. 5D is a simplified diagram of a side view of an input device with adjustable body panels configured in a customized configuration, according to an embodiment of the invention.

DETAILED DESCRIPTION

Embodiments of the invention are generally directed to systems and methods for customizing and ergonomically improving an input device.

Figure 1:
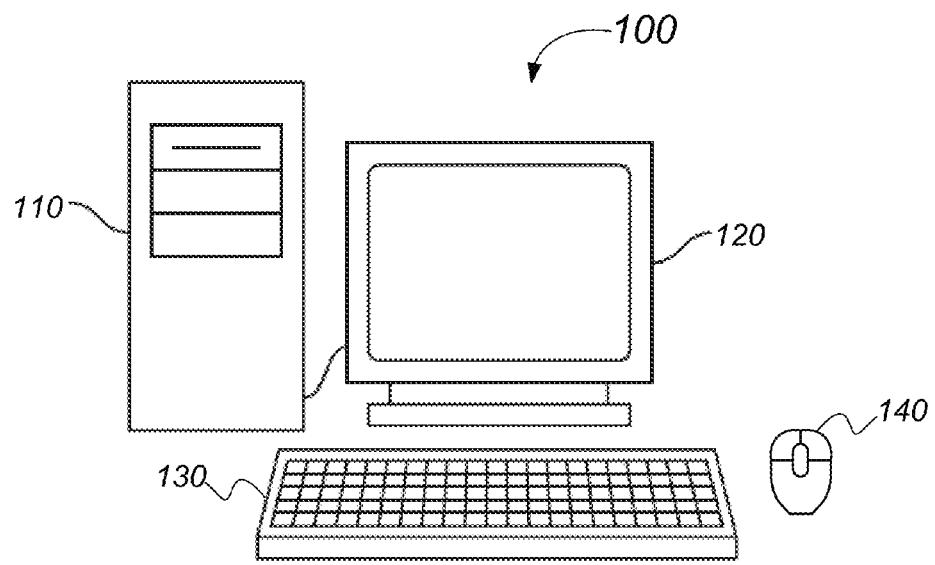
FIG. 1 is a simplified schematic diagram of a computer system, according to an embodiment of the present invention.

FIG. 1 is a simplified schematic diagram of a computer system 100 according to an embodiment of the present invention. Computer system 100 includes computer 110, monitor 120, keyboard 130, and input device 140. In one embodiment, input device 140 can be a computer mouse, a remote control device, a game controller, a trackball, a track pad, a touch sensitive device (e.g., tablet computer, personal digital assistant, media player, etc.), a mobile device, or any other suitable device that can be used to convert analog input signals into digital signals for computer processing. For computer system 100, input device 140 and the keyboard can be configured to control various aspects of computer 110 and monitor 120.

In some embodiments, input device 140 can be configured to provide control signals for movement tracking (e.g., x-y movement on a planar surface, lift detection, etc.), touch/gesture detection, lift detection, orientation detection, power management methods, customization controls for ergonomic adjustments and contour customization, which is further discussed below, and a host of additional features that would be appreciated by one of ordinary skill in the art with the benefit of this disclosure. Computer 110 may include a machine readable medium (not shown) that is configured to store computer code, such as mouse driver software, keyboard driver software, and the like, where the computer code is executable by a processor (not shown) of the computer 110 to affect control of the computer 110 by input device 140 and keyboard 130. The various embodiments described herein generally refer to input device 140 as a computer mouse or similar input device, however it should be understood that input device 140 can be any input/output (I/O) device, user interface device, control device, input unit, or the like.

Figure 2:
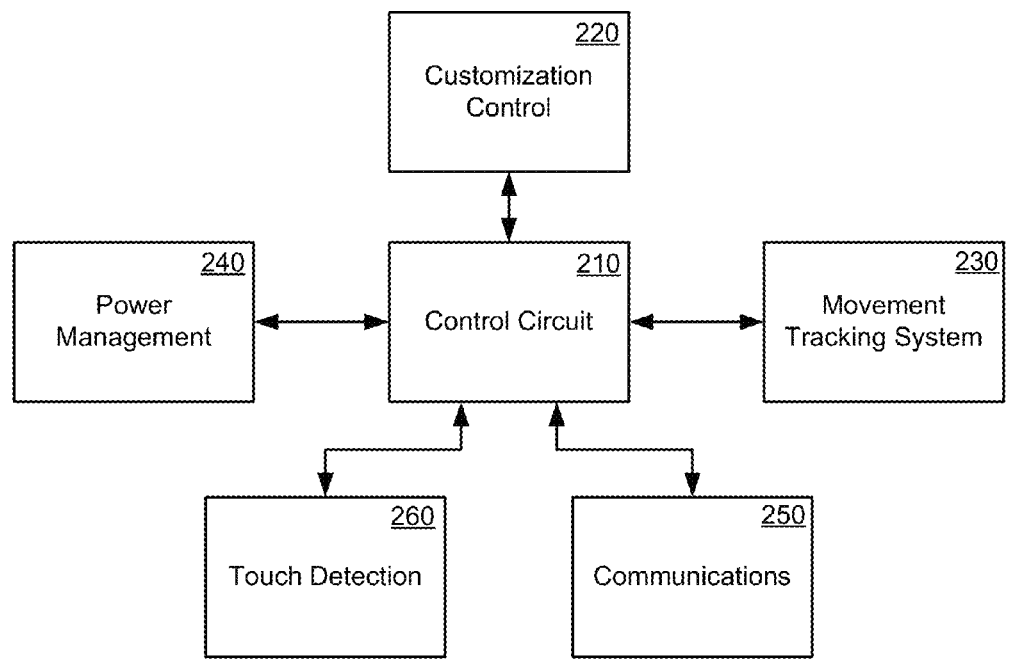
FIG. 2 is a simplified block diagram of a system configured to operate an input device, according to an embodiment of the invention.

FIG. 2 is a simplified block diagram of a system 200 configured to operate input device 140, according to an embodiment of the invention. System 200 includes control circuit 210, customization control block 220, movement tracking system 230, power management system 240, communication system 250, and touch detection system 260. Each of the system blocks 220-260 can be in electrical communication with the control circuit 210. System 200 may further include additional systems that are not shown or discussed to prevent obfuscation of the novel features described herein.

In certain embodiments, control circuit 210 comprises one or more microprocessors (μCs) and can be configured to control the operation of system 200. Alternatively, control circuit 210 may include one or more microcontrollers (MCUs), digital signal processors (DSPs), or the like, with supporting hardware and/or firmware (e.g., memory, programmable I/Os, etc.), as would be appreciated by one of ordinary skill in the art with the benefit of this disclosure. Alternatively, MCUs, μCs, DSPs, and the like, may be configured in other system blocks of system 200. For example, customization control block 230 may include a local processor to control the customization processes described herein (e.g., shape memory polymer control, mechanical piston control, etc., as further described below). In some embodiments, multiple processors may provide an increased performance in system 200 speed and bandwidth. It should be noted that although multiple processors may improve system 200 performance, they are not required for standard operation of the embodiments described herein.

Customization control block 220 includes one or more sub-systems that can be configured to control various aspects of the ergonomic systems and comfortable region(s) that can be disposed on input device 140. For example, some embodiments may control a heater element in a shape memory polymer (SMP) system. Certain embodiments may control a micro-pump and valve control system for ergonomic systems using vacuum bag-based conformable regions. Further embodiments may control a locking blade in a mechanical piston-based conformable region. Moreover, some embodiments may control electrical characteristics of magnetoreostatic-based conformable region systems. Customization control block 220 may be a discrete system utilizing a local processing device, or may be integrated or subsumed in control circuit 210. Some or all of the customization control systems can be included in a single embodiment, or multiple embodiments, as required by design. The ergonomic systems and conformable regions that may utilize these control mechanisms are further discussed below.

Movement tracking system 230 is configured to track a movement of input device 140, according to an embodiment of the invention. In certain embodiments, movement tracking system 240 can use optical sensors such as light-emitting diodes (LEDs) or an imaging array of photodiodes to detect a movement of input device 140 relative to an underlying surface. Input device 140 may optionally comprise movement tracking hardware that utilizes coherent (laser) light. In certain embodiments, one or more optical sensors are disposed on the bottom side of input device 140 (not shown). Movement tracking system 230 can provide positional data (e.g., X-Y coordinate data) or lift detection data. For example, an optical sensor can be used to determine when a user lifts input device 140 off of a surface and send that data to control circuit 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine if input device 140 has been lifted off of a surface and provide movement data that can include the velocity, physical orientation, and acceleration of input device 140. In some embodiments, gyroscope(s) can be used in lieu of or in conjunction with accelerometer(s) to determine movement or input device orientation.

Power management system 240 can be configured to manage power distribution, recharging, power efficiency, and the like, for input device 140. In some embodiments, power management system 240 can include a battery (not shown), a USB based recharging system for the battery (not shown), power management devices (e.g., low-dropout voltage regulators—not shown), and a power grid within system 200 to provide power to each subsystem (e.g., accelerometers 220, gyroscopes 230, etc.). In certain embodiments, the functions provided by power management system 240 may be incorporated into the control circuit 210.

Communications system 250 can be configured to provide wireless communication with the computer 110, or other devices and/or peripherals, according to certain embodiment of the invention. Communications system 250 can be configured to provide radio-frequency (RF), Bluetooth, infra-red, or other suitable communication technology to communicate with other wireless devices. System 200 may optionally comprise a hardwired connection to computer 110. For example, input device 140 can be configured to receive a Universal Serial Bus (USB) cable to enable bi-directional electronic communication with computer 110 or other external devices. Some embodiments may utilize different types of cables or connection protocol standards to establish hardwired communication with other entities.

In some embodiments, touch detection system 260 can be configured to detect a touch or touch gesture on one or more touch sensitive surfaces on input device 140. Touch detection system 260 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can be configured to detect at least one of changes in the received signal, the presence of a signal, or the absence of a signal. Furthermore, a touch sensor may include a source for emitting the detected signal, or the signal may be generated by a secondary source. Touch sensors may be configured to detect the presence of an object at a distance from a reference zone or point, contact with a reference zone or point, or a combination thereof. Certain embodiments of input device 140 may not utilize touch detection or touch sensing capabilities.

Various technologies can be used for touch and/or proximity sensing. Examples of such technologies include, but are not limited to, resistive (e.g., standard air-gap 4-wire based, based on carbon loaded plastics which have different electrical characteristics depending on the pressure (FSR), interpolated FSR, etc.), capacitive (e.g., surface capacitance, self-capacitance, mutual capacitance, etc.), optical (e.g., infrared light barriers matrix, laser based diode coupled with photo-detectors that could measure the time of flight of the light path, etc.), acoustic (e.g., piezo-buzzer coupled with some microphones to detect the modification of the wave propagation pattern related to touch points, etc.), etc.

It should be noted that although certain necessary systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in control circuit 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., shape memory polymer heater control, micro-pump control, mechanical blade control, etc.) as described herein.

It should be appreciated that system 200 is illustrative and that variations and modifications are possible. System 200 can have other capabilities not specifically described here (e.g., mobile phone, global positioning system (GPS), power management, one or more cameras, various connection ports for connecting external devices or accessories, etc.). Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 200 may be combined with or operated by other sub-systems as required by design. For example, customization control block 220 may operate within control circuit 210 instead of functioning as a separate entity. Moreover, it should be understood that the various embodiments of conformable regions discussed herein can be of any size, shape, color, texture, etc., and can be applied to any input device (e.g., input device 140), with any suitable control infrastructure (e.g., system 200 including combinations and subsets thereof), at any preferred location and in any desired configuration.

Comformable Regions Using Shape Memory Polymers

Shape-memory polymers (SMPs) can be polymeric smart materials ("polymer alloy") that can return from a deformed or temporary state to an original shape when induced by an external stimulus, such as a temperature change. In some embodiments, SMPs can retain two or more shapes, and the catalyst to induce the transition between shapes may include certain temperature thresholds. Alternative embodiments may react similarly when exposed to certain light stimuli, electrical stimuli, magnetic fields, or chemical solutions.

Shape-memory polymers can include thermoplastic and covalently cross-linked (thermoset) polymeric materials. SMPs typically have both a temporary form and a permanent form. Once the permanent form has been manufactured by conventional methods, the SMP material can be changed into a different and temporary form by heating the SMP at or above a threshold temperature, deforming the SMP to a desired shape (e.g., applying a pressure to the SMP), and cooling the SMP below the threshold temperature. Thus, the SMP can maintain its temporary shape until activated by an external stimulus (e.g., temperature), which causes the SMP to revert back to its permanent form. In some cases, the heating/cooling system may have hysteresis, such that the cooling threshold temperature can be above or below the heating threshold temperature.

In addition to temperature, other activating stimuli may be used with certain types of SMP materials. For instance, light-activated shape-memory polymers (LASMP) use processes of photo-crosslinking and photo-cleaving to change a transition temperature. Photo-crosslinking may be achieved by using one wavelength of light, while a second wavelength of light may reversibly cleave the photo-cross-linked bonds. The result being an SMP material that can be reversibly switched between an elastomer and a rigid polymer. In such cases, light activation changes the cross-linking density of the SMP. There are myriad SMP types that utilize a variety of different activation methods that may be used in the embodiments described herein, as would be understood by one of ordinary skill in the art.

With respect to the embodiments described herein, SMP-based materials can be used to deform or reshape a contour of an input device per a user's ergonomic preference. SMP technology, as applied to input devices, can allow multiple users to utilize the same input device and enjoy the benefit of a customized body contour that can change to suit each user's needs. Various non-limiting embodiments of input devices using shape memory polymers and polymer alloys for customizable and deformable body contours are described herein.

Figure 3A:
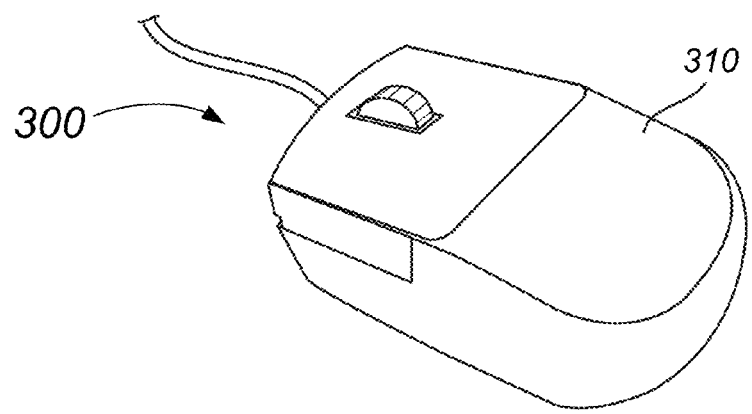
FIG. 3A illustrates an input device configured to accommodate one or more SMP-based conformable regions, according to an embodiment of the invention.

FIG. 3A illustrates an input device 300 configured to accommodate one or more SMP-based conformable regions, according to an embodiment of the invention. Input device 300 can include a housing 310 and one or more connector sites (not shown). The housing can include a top side, a left side, a right side, and a bottom side, where the housing is configured to support a user's hand. A connector site can be configured to attach one or more detachable components with conformable regions to the input device 300. For example, an SMP-based detachable faceplate 320 may mechanically attach to input device 310 via the connector sites. Alternatively, the one or more conformable regions can be configured to attach to input device 300 by any suitable means (e.g., latches, screws, adhesives, magnets, etc.). In some cases, input device 300 may include multiple detachable components (e.g., detachable faceplate 320) with conformable regions. Although input device 300 is depicted as a computer mouse, it should be understood that the conformable regions described herein may be applied to any preferred input device (e.g., game controller, remote control, etc.).

Figure 3B:
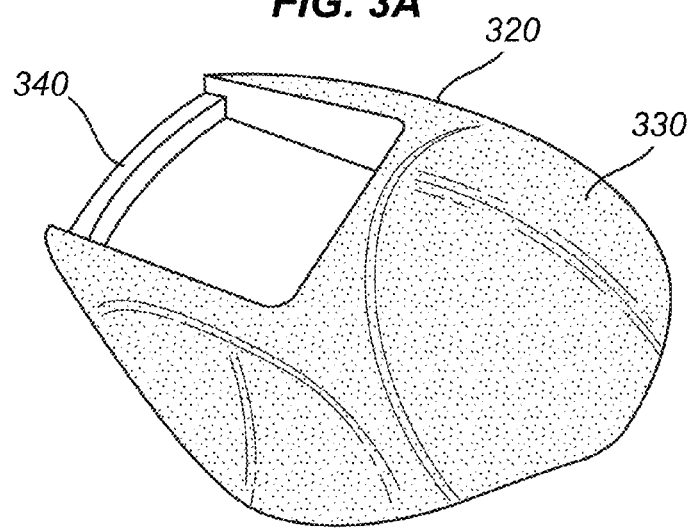
FIG. 3B illustrates a detachable faceplate configured to attach to an input device, according to an embodiment of the invention.

FIG. 3B illustrates a detachable faceplate 320 configured to attach to input device 310, according to an embodiment of the invention. Detachable faceplate 320 can include one or more conformable regions 330 disposed thereon. Conformable region 330 can include an SMP 330 disposed over the entire surface of detachable face plate 320, or portions thereof. Detachable faceplate 320 can further include an attachment means to attach detachable faceplate 320 to input device 310. For example, detachable faceplate 320 can be configured to mechanically snap into place on input device 310 at one or more attachment points. Detachable faceplate 320 may attach to input device 310 by any suitable means (e.g., mechanical, adhesive, magnet, or the like). In some cases, detachable faceplate 320 attaches to the top side of housing 310 and is configured to support a user's hand resting on input device 300.

Figure 3C:
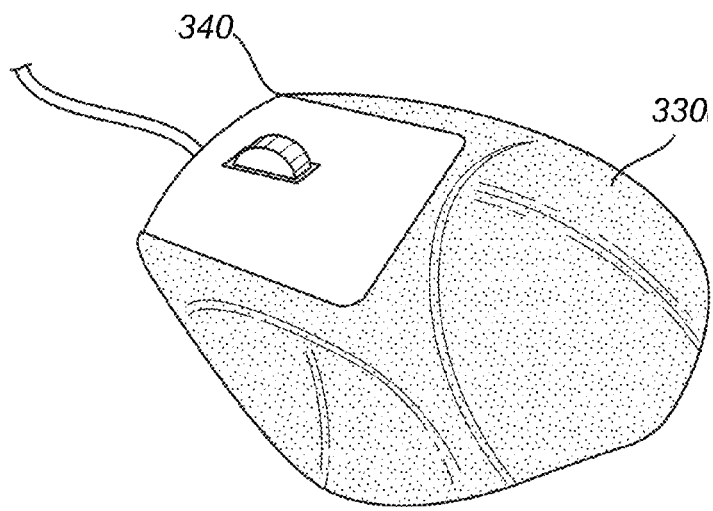
FIG. 3C illustrates how a detachable faceplate attaches to an input device, according to an embodiment of the invention.

FIG. 3C illustrates how detachable faceplate 320 attaches to input device 310, according to an embodiment of the invention. Detachable faceplate 320 can include a conformable region 330 disposed thereon. Conformable region 330 can include a shape memory polymer disposed over the entire surface of detachable face plate 320, or portions thereof. In alternative embodiments, SMP-based conformable regions 330 may be permanently affixed to input device 310.

The contour of SMP-based conformable region 330 can be deformed or reshaped (i.e., reprogrammed, reset) per user preference. As described above, SMPs can be a pliable and flexible material and can conform to a user's hand when the temperature of the SMP rises at or above a threshold temperature. Conversely, the SMP can be firm and non-conforming when the temperature of the SMP falls below a threshold temperature. Thus, when the SMP is above the heating threshold temperature, a user can customize the contour of input device 300 by placing their hand on conformable region 330 and applying pressure to conform that shape of conformable region 330 to preference.

In certain embodiments, the threshold temperature of the SMP can be approximately 60° C. to 80° C., however any suitable temperature can be used as would be appreciated by one of ordinary skill in the art. The operating temperature of the input device 310 is typically between 0° C. to 40° C., however more robust designs can accommodate more extreme conditions. In some embodiments, the SMP temperature is not conveyed to a user's hand because the SMP can have external layers of material for both aesthetic considerations and insulating a user's hand from the heat. SMP can be applied in a number of forms. For example, SMP can be a foam with or without a heating element or heating means, the SMP can be in the form of a skin with or without a heating element or heating means, or an SMP link with or without a heating means between two parts, as further described below. In certain embodiments, SMP deformation typically ranges from approximately +/−5 mm. Some embodiments can use other ranges (e.g., +/−3 mm, +/−8 mm, or the like).

In one example, a user may habitually grip input device 300 in such a manner that their palm is tilted in one direction and their thumb rests firmly on a side portion of conformable region 330. In response to the user's hand pressure (and with the SMP at or above the threshold temperature), the conformable region 330 may be re-contoured such that a tilted palm imprint and a deep thumb impression are formed, thereby perfectly matching the user's ergonomic preference. When the temperature of the SMP falls below the cooling threshold temperature, the newly contoured conformable region 330 becomes firm and maintains its new shape in response to subsequent pressure on the SMP.

According to certain embodiments, input device 300 may include an internal or embedded heating system (not shown). The internal heating system can be controlled by customization control block 220, control circuit 210, or a combination thereof. The internal heating system may utilize an heating element configured to heat the SMP to a temperature at or above the heating threshold. A heating element typically converts electricity into heat by conduct an electric current through an element of a certain resistance, resulting in a heating of the element. Heating elements can use NiChrome wires, ribbons, strips, or other conducting materials like metals or carbonous compounds. Alternative embodiments may use resistance wire, molybdenum disilicide (with various dopings), screen-printed metal-ceramic tracks, etched foil, ceramics, thick film technologies, Peltier elements, or the like.

In some embodiments, the internal heating system may include a NiChrome conductive heater element mesh configured on or near the SMP portions of input device 300 to provide an even temperature distribution of the SMP surface area. In other aspects, the heating system may utilize an internal point source for applying heat to the SMP regions. Furthermore, the heated area can be made visible by thermochromatic materials at the surface. These signal the locally elevated temperature and/or the readiness for conformation.

In further embodiments, external heating systems may be used to apply heat to the SMP regions (i.e., conformable region 330). For example, the SMP-based detachable faceplate 320 can be heated to the heating threshold by way of hot water, blow dryer, open flame, or any suitable means. The detachable faceplate 320 can make heating the SMP more convenient, safer, and may protect other heat-sensitive components (e.g., touch sensors, etc.) from damage.

Input device 300 can optionally include an SMP cooling system (not shown). For example, input device 300 may have an internal fan that blows air on or near the SMP to help reduce the SMP temperature below the cooling threshold.

It should be understood that the embodiments described herein are non-limiting and any combination or permutation thereof can be realized. For example, some input devices may include a number of separate SMP-based conformable regions disposed thereon. The conformable regions may be fixed, detachable, or a combination thereof. Furthermore, the SMP-based conformable regions may be applied to any type of device including cell phones, remote controls, wrist supports, or any application where a conformable region may be useful. In some embodiments, SMP foam, or SMP skin over a regular foam can be used in a headset device. For example, SMP foam can be used in over-the-ear headsets to provide a comfortable and cushioned fit. The SMP foam can also be used as a customized ear plug or earpiece.

Figure 4:
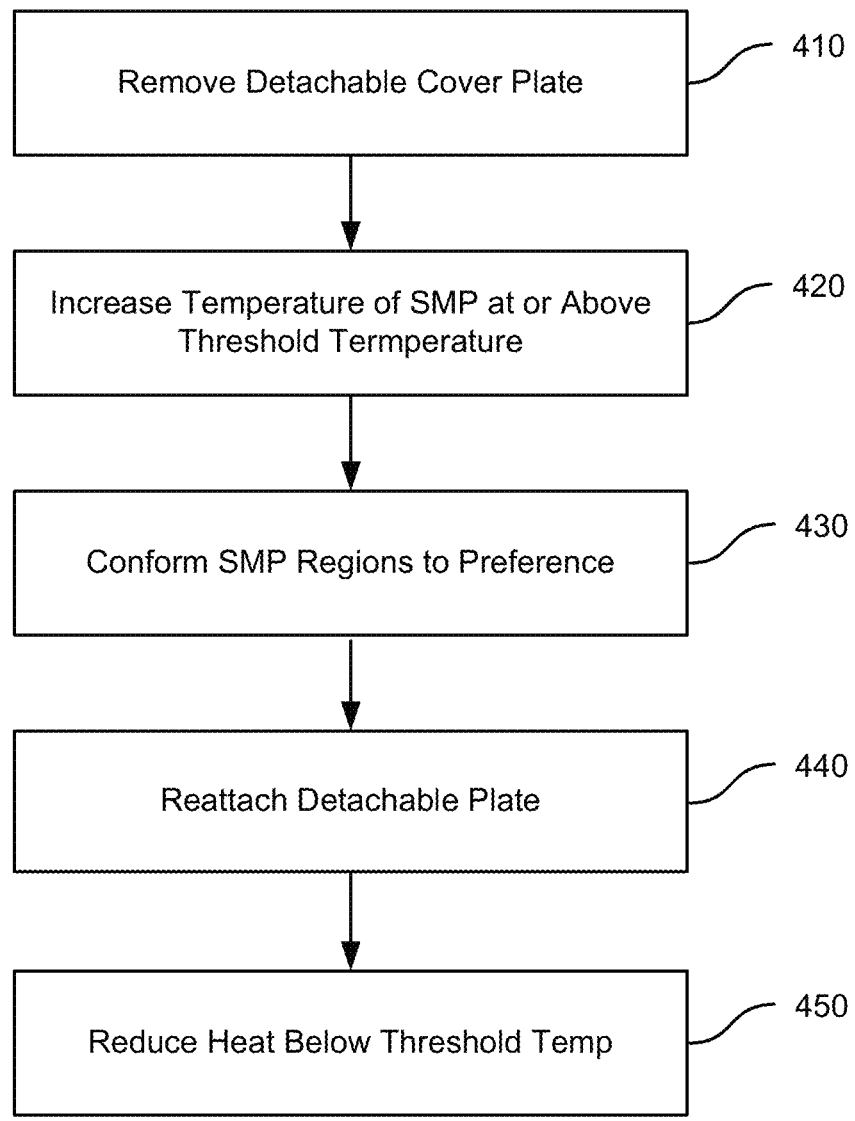
FIG. 4 is a simplified flow diagram illustrating a method for customizing a contour of an input device, according to an embodiment of the invention.

FIG. 4 is a simplified flow diagram illustrating a method 400 for customizing a contour of an input device, according to an embodiment of the invention. Method 400 can be performed, for example, on input device 300 to shape the conformable region 330 to a desired contour.

At 410, method 400 begins with removing the detachable cover plate 320 from the housing 310 of input device 300. Detachable cover plate 320 can include conformable region 330 with a shape memory polymer disposed thereon. In some embodiments, detachable cover plate 320 attaches to housing 310 by mechanical connection (e.g., latches, screws, bolts, brads, tabs, etc.), by adhesive, by magnets, or by any other suitable attachment method, as would be appreciated by one of ordinary skill in the art.

At 420, the temperature of the shape memory polymer is increased to the heating threshold temperature. The SMP can be heated by an internal or embedded heating system (not shown) or by an external heating source. The internal heating system can be controlled by customization control block 220, control circuit 210, or a combination thereof. For example, the control circuit can ensure that the heating time is under control so that no excessive temperatures are reached. One or more temperature sensors can be used for feedback e.g., to inform the control circuit 210 or processor of the current temperature, or to display the temperature to inform a user). An LED (light emitting diode), buzzer, or other suitable device can be used to indicate to the user that the SMP has reached a conform-ability threshold. The same process can apply to identify a suitable cooling time. The internal heating system may utilize a heating element configured to heat the SMP to a temperature at or above the heating threshold. In some cases, the heating element can use one or more of NiChrome wires, ribbons, strips, or wire mesh.

In certain embodiments, the internal heating system is automatically controlled by input device 300. For example, the internal heating system may automatically turn on in response to detecting pressure (e.g., from a user's hand) or movement of input device 300. In some aspects, a user can manually implement the heating function by way of a button, type sensor, software command, etc. The implementation of an automatic internal heating system would be understood by one of ordinary skill in the art with the benefit of this disclosure.

Alternatively, external heating systems may be used to apply heat to the SMP regions (i.e., conformable region 330). For example, the SMP-based detachable faceplate 320 can be heated to the heating threshold by way of boiling water, a blow dryer, an open flame, or any other suitable means of increasing the temperature of the SMP to the heating threshold.

At 430, the user shapes the heated SMP on conformable region 330 to a preferred contour. As described above, SMPs can be a pliable and flexible material and can conform to a user's hand when the temperature of the SMP rises at or above a threshold heating temperature. In other words, a user can customize the contour of input device 300 by placing their hand on conformable region 330, heating the conformable region 330 to at least the heating threshold temperature, and applying pressure to conform the shape of conformable region 330 to preference.

At 440, detachable cover plate 320 is reattached to housing 310 of input device 300.

At 450, the temperature of the SMP falls below the cooling temperature threshold, and the customized contour of the SMP-based conformable region 330 retains its shape (i.e., the shape imposed by the user due to the user's applied pressure). The temperature of the SMP may fall below the cooling temperature threshold due to the ambient temperature around input device 300. Alternatively, a cooling system may be used to reduce the SMP temperature below the cooling temperature threshold at a faster rate than ambient air. Once the SMP drops below the cooling temperature threshold, the customized contour of the SMP-based conformable region 330 hardens and maintains its newly molded shape.

It should be appreciated that the specific steps illustrated in FIG. 4 provide a particular method of customizing a contour of an input device, according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 400.

Input Devices with Adjustable Body Panels

Input devices with (continuously) adjustable body panels can allow a user to customize and configure the shape of an input device in any number of desired configuration. For example, some users may prefer input devices with taller and wider profiles and parallel angles or contours. Other users may prefer input devices with smaller profiles and incongruous angles or contours. Thus, a single input device with adjustable body panels can be configured to accommodate a wide variety of ergonomic requirements.

In some embodiments, an input device can use a variety of mechanical connectors to couple each of the adjustable body panels to a central housing. Some of the mechanical connectors may include screws, sliders, tabs, bolts, pins, latches, hinges, or the like. Alternatively, somebody panels may be coupled to the housing via slots, tracks, or other guiding mechanisms. Though reliable, mechanical coupling typically requires many moving parts, higher costs, and is subject to wear and tear over time.

In further embodiments, SMP links can be used to couple the adjustable body panels to the central housing. As described above, SMP links or connectors can be highly flexible, manipulable, pliable, stretchable, compressible, configurable, and can offer nearly unlimited freedom of motion. Furthermore, SMP links require no moving parts, they are cheap, highly reliable, they are subject to minimal wear and tear, and have broad applicability. In order to increase flexibility, an SMP link can equally comprise a mechanical system like a spring or other element to provide a restoring force.

FIGS. 5A and 5B are simplified diagrams of a top view and side view of an input device 500 with adjustable body panels, according to an embodiment of the invention. Input device 500 includes a left panel 520, right panel 530, and top panel 540. Each panel is coupled to a housing 550 by a number of shape memory polymer links. Left panel 520 is coupled to housing 550 via SMP link 515, right panel 530 is coupled to housing 550 via SMP link 525, and top panel 540 is coupled to housing 550 via SMP link 535. The SMP links allow user to adjust the spacing and pivoting angle of each of the body panels with respect to the housing 550. In some embodiments, the SMP links can be SMP foam links. Input device 500 can further include an embedded heating system (not shown) configured to apply heat to each of the SMP links.

In operation, the embedded heating system can heat each of the SMP links to the heating temperature threshold. The user can then manipulate, pivot, and adjust the body panels in any desired configuration within the flexible boundaries of the SMP. Once a configuration is set and the temperature of the SMP links falls below a cooling temperature threshold, the SMP links become firm and inflexible, thus maintaining the set newly set body panel configuration.

FIGS. 5A and 5B respectively show a top view and side view of input device 500 in and out-of-the-box configuration (i.e., stock configuration). Each body panel is configured at a substantially uniform pitch, angle, and spacing with respect to housing 550. In contrast, FIGS. 5C and 5D respectively show a top view and side view of input device 500 in a customized configuration. For example, left panel 520 is both tilted upwards and forwards with respect to housing 550. Right panel 530 maintains its pitch and angle, but has been moved closer to housing 550. Similarly, top panel 540 maintains its pitch angle, but has been moved closer to housing 550.

Alternative embodiments can use any number of adjustable body panels or SMP links as required by design. For example, some embodiments may have a bottom panel that can raise, lower, or tilt and input device in a variety of configurations. Some embodiments may have multiple top panels, side panels, or bottom panels for greater flexibility and more options in contour design. Body panels can optionally include two or more SMP links. In some cases, SMP links may be used in conjunction with mechanical links. For example, a body panel can be clipped to an SMP, thus various panels with preformed shapes can be adjusted due to the SMP link (e.g., yaw, pitch, roll, pump, etc.).

In certain embodiments, embedded heating systems (not shown) can be configured to heat the SMP links individually or simultaneously. The embedded heating systems can be controlled manually by a user (e.g., via button, pressure plate/switch, etc.) or automatically by input device 500. For example, the customization control blocked 220 may automatically turn on the heating system in response to a user command (e.g., button, switch, touch sensor activation, voice activation, etc.), software command, pressure detection, or other suitable means that would be known by those skilled in the art to determine when a user wants to adjust the configuration of the body panels.

Conformable Regions Using Vacuum Bagged Micro-Balls

Vacuum bagged micro-balls ("comfort cells") provide an alternative solution to heat-activated shape-memory polymers in providing conformable regions on input devices. Instead of using heat activation, comfort cells can be conformable and resettable by pumping air out of an elastic pocket filled with micro-balls. With air present in the elastic pocket, the micro-balls can freely shift around inside the pocket in response to an applied pressure (e.g., a touch, gravity, palm press, etc.), thus making the air-filled elastic pocket conformable. In other words, in order to have the micro-balls moving freely (i.e., not frozen by vacuum) the elastic pocket should be at the same pressure as the ambient pressure. As such, valve to the elastic pocket should be open. When a vacuum is applied (i.e., the air is evacuated or pumped out of the elastic pocket), the micro-balls are squeezed and "frozen" into position in a desired shape. The valve can then be closed to lock in that shape. This process can be loosely compared to sitting on a bean bag chair. Once the elastic pocket is configured to a desired shape, the air is evacuated from the elastic pocket and the combination of the elastic pocket and vacuum bagged micro-balls become rigid and are locked into place in the presence of the vacuum. Comfort cells can be used as conformable regions on an input device, as further described below.

Figure 6A:
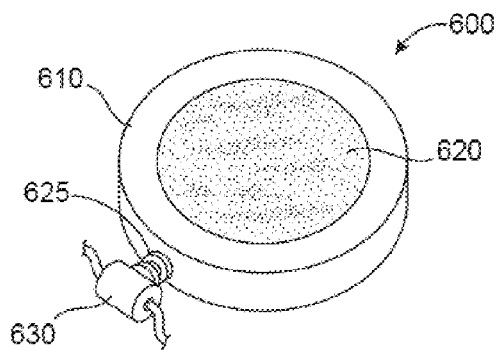
FIG. 6A illustrates a comfort cell comprising vacuum bagged micro-balls, according to an embodiment of the invention.

FIG. 6A illustrates a comfort cell 600 comprising vacuum bagged micro-balls, according to an embodiments of the invention. Comfort cell 600 can include a frame or bottom portion 610, an elastic pocket ("conformable region") 620, a valve 625, a micro-pump 630, and a number of micro-balls (not shown) disposed inside of elastic pocket 320. In some aspects, the micro-balls are small spheres of plastic material with some friction or sand. The pocket 620 can be made of an elastic polymer. In certain embodiments, an external portion of the elastic pocket 620 can be covered by a flexible rubber or gel layer to help filter or reduce the micro-ball roughness or bumpiness and add additional comfort to comfort cell 600.

Figure 6B:
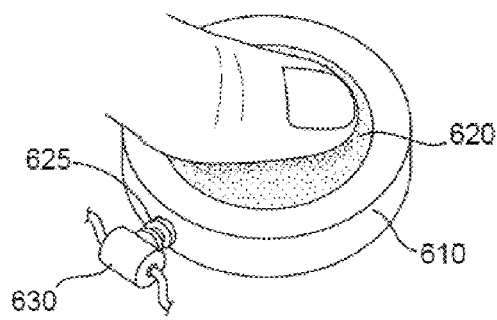
FIG. 6B illustrates a user conforming a comfort cell by pressing a thumb into the elastic pocket, according to an embodiment of the invention.
Figure 6C:
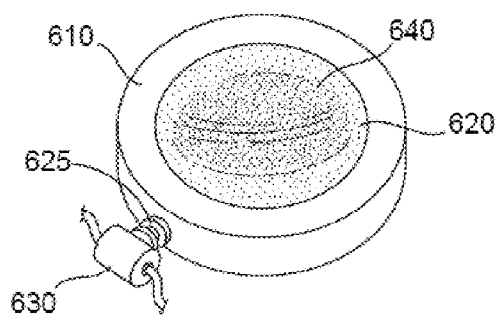
FIG. 6C illustrates an elastic pocket having has a semi-permanent imprint of the user's thumb, according to an embodiment of the invention.

Micro-pump 630 and valve 625 operate to pump a gas (e.g., air) into and out of the elastic pocket 620. For example, to place comfort cell 600 in a conformable state, valve 625 opens in micro-pump 630 allows gas (e.g., air) into the elastic pocket 620. Valve 625 can then close and seal the gas inside of elastic pocket 620, making comfort cell 600 conformable, as illustrated in FIG. 6A. FIG. 6B illustrates a user conforming comfort cell 600 by pressing a thumb into elastic pocket 620. Once conformable cell 600 is configured into a desired form, valve 625 can open and micro-pump 630 can vacuum pump the gas out of elastic pocket 620. Valve 625 can then close and maintain the vacuum inside of elastic pocket 620, thus locking into place the elastic pocket and micro-balls therein. As shown in FIG. 6C, elastic pocket 620 has a semi-permanent imprint 640 of the user's thumb. In some embodiments, the conformable state occurs when valve 625 opens and allows gas to enter such that the pressure inside elastic pocket 620 is in equilibrium with the ambient pressure. In other embodiments, pump 630 may pump gas into elastic pocket 620 in order to place the comfort cell 600 in a conformable state. In such cases, the pressure can be slightly different than ambient pressure, but not too much such that elastic pocket 620 swells too much for reliable comforming.

Figure 6D:
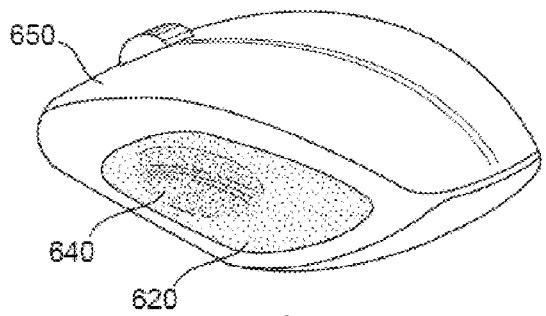
FIG. 6D illustrates a comfort cell disposed on an input device, according to an embodiment of the invention.

FIG. 6D illustrates a comfort cell 600 (i.e., conformable region) disposed on an input device 650, according to an embodiment of the invention. Frame 610 (not visible) supports elastic pocket 620 with the semi-permanent imprint 640 thereon. Micro-pump 630 and valve 625 (not shown) can be configured inside the mouse and controlled by customization control block 220, control circuit 210, or a combination thereof. Although comfort cell 600 is only shown in one particular position (i.e., thumb region), comfort cell 600 can be used in any desired location of input device 650. For example, a larger comfort cell can be disposed on the top side of input device 650 to accommodate a user's palm. As described above, comfort cells can be coupled to any input device, and more generally to any desired surface or location.

It should be appreciated that the embodiments described herein are illustrative and non-limiting. Other variations, implementations, and alternative uses can be used, as would be appreciated by one of ordinary skill in the art with the benefit of this disclosure. For example, some embodiments may not utilize a frame or backing portion 610 and may simply include an elastic pocket coupled to a surface by mechanical means, adhesive, or other means. The elastic pocket (i.e., conformable region) can be implemented in any size, shape, color, or texture, and some embodiments may use more than one micro-pump or valve. In some embodiments, the pump and vacuum control can be manually operated by a user or automatically controlled by the customization control block 220. In some alternative embodiments, elastic pocket 620 can be pumped and evacuated by an external valve and micro-pump (e.g., external to input device 650).

Figure 7:
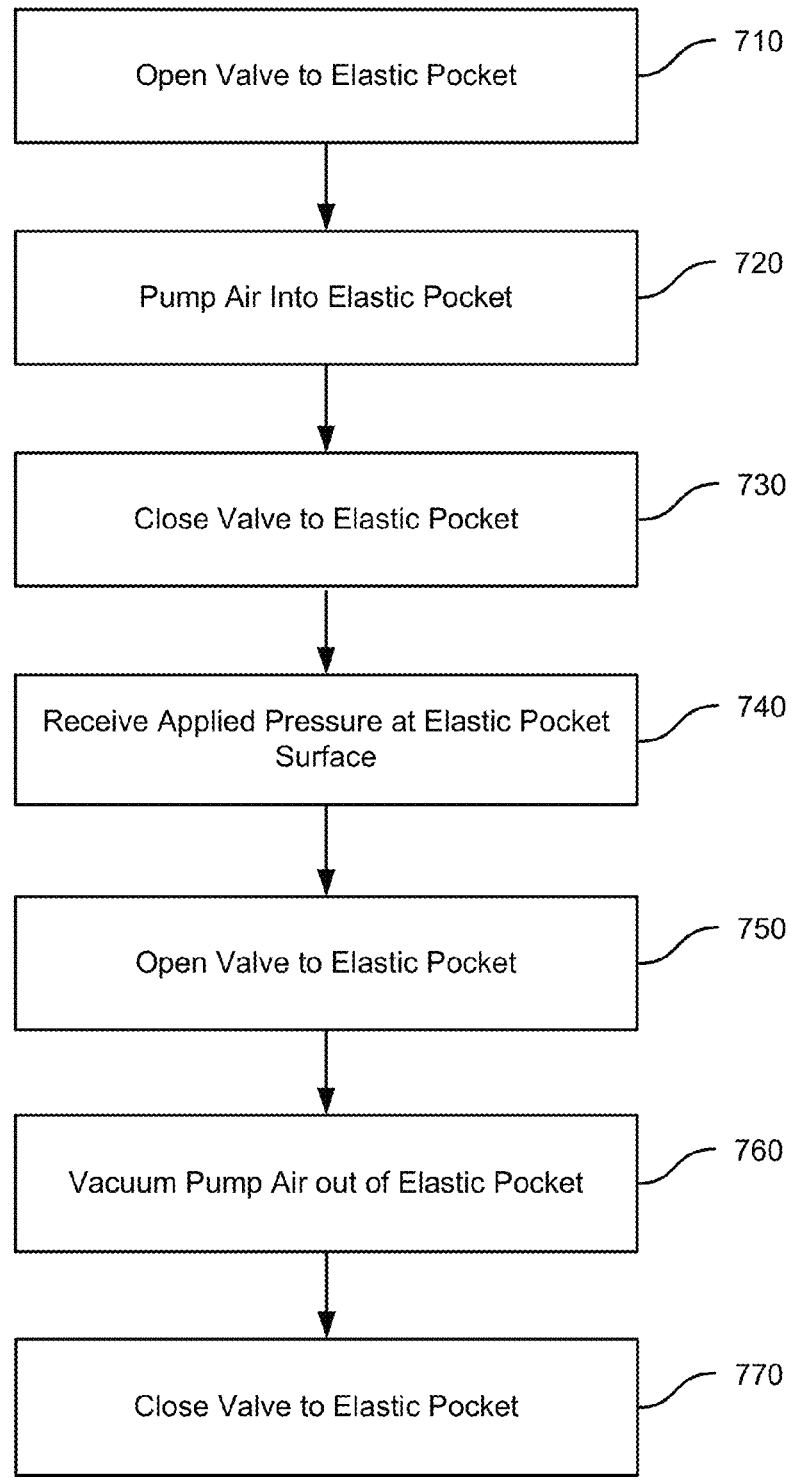
FIG. 7 is a simplified flow diagram illustrating a method for customizing a contour of an input device, according to an embodiment of the invention.

FIG. 7 is a simplified flow diagram illustrating a method 700 for customizing a contour of an input device, according to an embodiment of the invention. Method 700 can be performed on input device 650 to shape the conformable region 620 to a desired contour.

At 710, method 700 begins with opening valve 625 of comfort cell 600. Valve 625 can be opened manually by a user (i.e., via switch or external controller), or automatically by custom control block 220, control circuit 210, or combination thereof.

At 720, micro-pump 630 pumps air into elastic pocket 620. Elastic pocket 620 can be filled with a number of micro-balls. In some embodiments, the micro-balls can be silicon-based. With air present in elastic pocket 620, the micro-balls can freely shift around inside the pocket in response to an applied pressure (e.g., a touch, gravity, palm press, etc.), thus making the elastic pocket (at ambient pressure) conformable.

At 730, valve 625 closes and seals the air inside elastic pocket 620.

At 740, elastic pocket 620 deforms in response to an applied pressure on its surface. More precisely, as an object applies pressure to elastic pocket 620, the micro-balls contained inside are shifted around such that the shape of elastic pocket 620 conforms to the shape of the object.

At 750, valve 625 opens and provides an air conduit between micro-pump 630 and elastic pocket 620.

At 760, micro-pump 630 vacuum pumps out the air inside elastic pocket 620. As the air is pumped out, elastic pocket 620 is molded around the shape of the micro-balls contained inside. The molding process can be loosely compared to a shrink wrapping effect.

At 770, valve 625 closes and seals the vacuum inside elastic pocket 620. Valve 625 maintains the vacuum inside elastic pocket 620 and prevents comfort cell 600 from losing its shape. In certain embodiments, a user is required to apply pressure to elastic pocket 620 until the vacuum seal is secured in order to maintain the desired deformation. In some cases, the micro-balls are operable to maintain a desired configuration within elastic pocket 620 (i.e., desired deformation of elastic pocket 620) prior to creating the vacuum. In other words, a user is not required to continually hold their thumb or palm in a conformable region (i.e., comfort cell 600) prior to establishing the vacuum seal. To illustrate, a user can press a thumb into comfort cell 600, thereby deforming its shape. The user can then remove the thumb prior to establishing a vacuum seal within elastic pocket 620 because the micro-balls can maintain their configuration without requiring support from elastic pocket 620 (i.e., the shrink wrapping effect) to hold them in place.

It should be appreciated that the specific steps illustrated in FIG. 7 provide a particular method of customizing a contour of an input device, according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 700.

Conformable Regions Based on Pistons and Elastic Skin

Figure 8A:
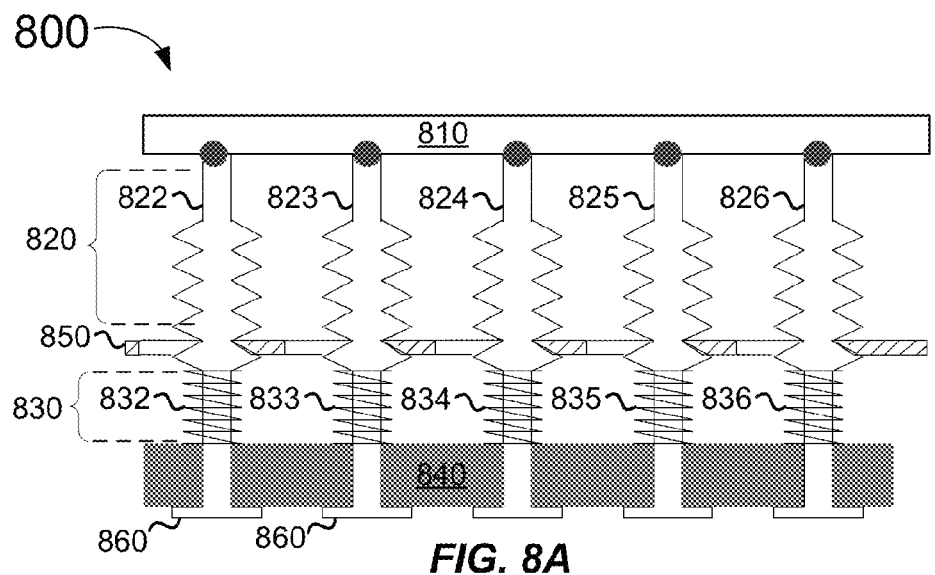
FIG. 8A illustrates a simplified diagram of a comfortable region comprising pistons and an elastic skin, according to an embodiment of the invention.

FIG. 8A illustrates a simplified diagram of a conformable region ("Piston Cell") 800 comprising pistons and an elastic skin, according to an embodiment of the invention. Piston cell 800 may be disposed on an input device (e.g., 300, 650) and can provide a mechanically-based solution for a conformable region allowing a user to customize the contour of the input device. Piston cell 800 can include an elastic skin 810, a plurality of pistons ("piston array") 820 including pistons 822-826, a guiding matrix 840, and a locking blade 850. Locking blade 850 is configured to lock each piston 820 in place. Each piston 820 can include a piston head 860 and a restoring spring 830 coupled thereto. In some embodiments, piston head 860 can be configured to prevent the piston 820 from moving beyond a certain position.

Each piston 820 is slideably coupled to guiding matrix 840. Each piston 820 includes a spring 830 configured to provide a restoring force to the piston 820. Each piston 830 is coupled to elastic skin 810. The elastic skin 810 serves to link together each piston 820 of the array of pistons 820, smooth the topology of the array of pistons 820, and provide an aesthetically pleasing surface. Elastic skin 810 can be made of any suitable rubber or elastic material as would be appreciated by one of ordinary skill in the art with the benefit of this disclosure. In some cases, elastic skin 810 can be an elastic polymer, polyurethane or suitable equivalent. The piston can be welded, glued, or be a part of a dual injected system with rigid pistons and flexible elastic skin. Furthermore, each piston 820 can be coupled to elastic skin 810 by any suitable method.

In certain embodiments, each piston 820 of piston cell 800 is configured to slide up-and-down relative to its respective slot in guiding matrix 840. Restoring spring 830 provides a restoring force to return piston 820 to the fully extended position, as shown in FIG. 8A. In some embodiments, restoring spring 830 can be a foam matrix. The locking blade 850 is coupled to the array of pistons 820 and is configured to lock each piston 820 in place. In FIG. 8A, locking blade 850 is also shown in the locked position. In some embodiments, an unlocked position (not shown) would show the glade cut shifted to the right such that the pistons 820 can move freely.

Figure 8B:
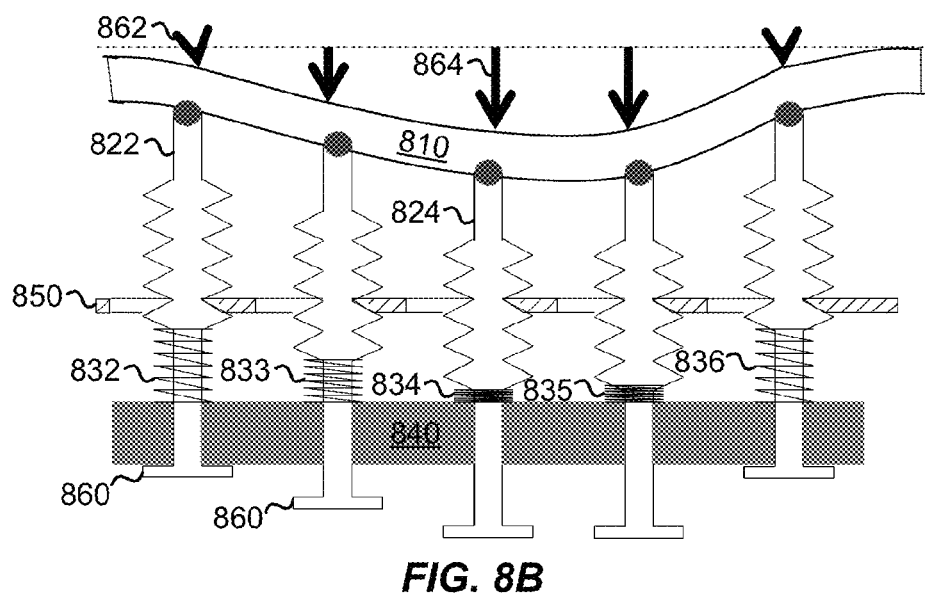
FIG. 8B illustrates a simplified diagram of a comfortable region comprising pistons and an elastic skin, according to an embodiment of the invention.

FIG. 8B illustrates a simplified diagram of a comformable region ("Piston Cell") 800 comprising pistons 820 and elastic skin 810, according to an embodiment of the invention. Piston cell 800 is receiving an external force 864 on elastic skin 810. The external force 864 can be any outside force, including, but not limited to, a user's finger or palm resting on piston cell 800. In some embodiments, elastic skin 810 is proportionally deformed with respect to the magnitude of the external force. For example, force 864 (e.g., the center of a finger tip) provides enough force to fully compress spring 834 and to move (i.e., displace) piston 824 to a fully compressed position. On the other hand, force 862 (e.g., the edge of the finger tip) provides less force, such that there is little to no displacement of spring 832 and piston 822. When the external force is removed and locking blade 850 is in the unlocked position, each of the springs 830 may cause their respective pistons 820 to return to the fully extended position. When the external force is removed and locking blade 850 is in the locked position, each piston 820 is locked in its current position. In some aspects, pistons 820 can move approximately +/−5 mm. Alternatively, the travel distance for each piston 820 can be approximately 10 mm from the fully extended position to the fully compressed position. Furthermore, the plurality of pistons 820 can be configured in any suitable shape, array, or configuration as required by design.

In some embodiments, locking blade 850 can be manually operated by a user or automatically controlled by customization control block 220. In some cases, there may be one locking blade 850 or many locking blades. Locking blade 850 can be a linear implementation (i.e., affecting a single row or column of pistons 820) or it can be implemented in an array (i.e., affecting all pistons 820 or a portion thereof).

Alternative embodiments may use other means and mechanisms for providing a restoring force to pistons 820. For example, air pressure or vacuum pressure may be used to return each piston 820 to its fully extended position.

It should be recognized that piston cell 800 can be used in any desired location of an input device (e.g., input device 300, 650). For example, a large piston cell 800 can be disposed on the top side of input device 650 to accommodate a user's palm. Alternatively, a small piston cell 800 can be disposed on the side of input device 650 to accommodate a user's thumb. Piston cells 800 can be coupled to any input device, and more generally to any desired surface or location.

Figure 9:
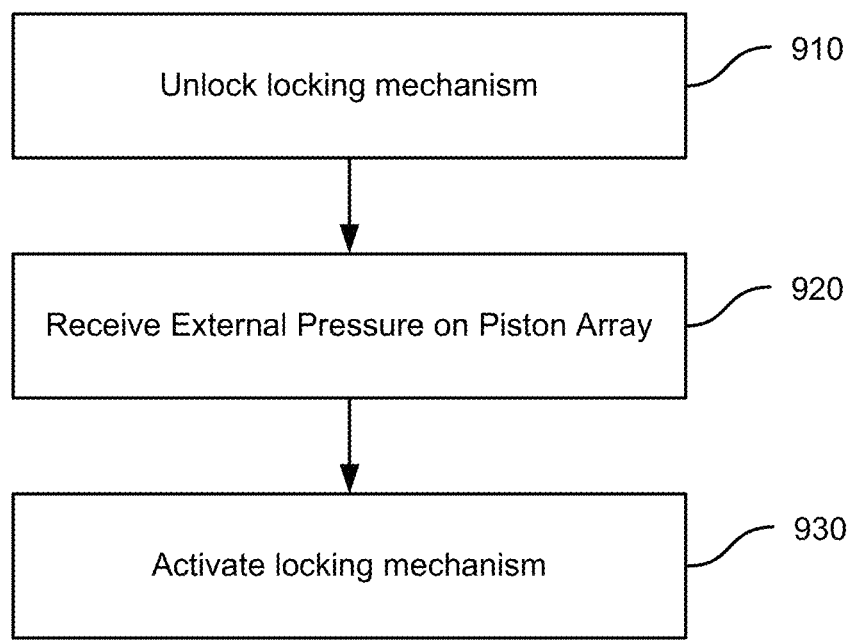
FIG. 9 is a simplified flow diagram illustrating a method for customizing a contour of an input device, according to an embodiment of the invention.

FIG. 9 is a simplified flow diagram illustrating a method 900 for customizing a contour of an input device, according to an embodiment of the invention. Method 900 can be performed on a suitable input device (e.g., input device 300/650) to shape a conformable region (piston cell 800) to a desired contour.

At 910, method 900 begins with unlocking the locking blade 850 of piston cell 800. When the locking blade 850 is in the unlocked position, pistons 820 can freely move up-and-down with respect to the guiding matrix 840. In some embodiments, locking blade 850 can be manually operated by a user. Alternatively, locking blade 850 can be controlled by customization control block 220, control circuit 210, or combination thereof. In some cases, there may be one locking blade 850 or many locking blades. Locking blade 850 can be a linear implementation (i.e., affecting a single row or column of pistons 820) or it can be implemented in an array (i.e., affecting all pistons 820 or a portion thereof).

At 920, piston cell 900 receives an external pressure on piston array 820 through elastic skin 810, as shown in FIG. 8B. For example, piston array 820 may receive an external pressure from an object such as a finger or palm resting on piston cell 900. The external pressure deforms piston array 820 to conform to the shape of the object.

At 930, method 900 continues with activating (i.e., locking) the locking blade 850. Thus, when the external force is removed from piston cell 900 and locking blade 850 is in the locked position, each piston 820 remains locked in its current position. In some aspects, each piston 820 can move approximately +/−5 mm. Alternatively, the travel distance for each piston 820 can be approximately 10 mm from the fully extended position to the fully compressed position, as shown in FIG. 8B.

It should be appreciated that the specific steps illustrated in FIG. 9 provide a particular method of customizing a contour of an input device, according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple substeps that may be performed in various sequences as appropriate to the individual step. Furthermore, additional steps may be added or removed depending on the particular applications. One of ordinary skill in the art would recognize and appreciate many variations, modifications, and alternatives of method 900.

Conformable Regions Based on Magneto Rheostatic Materials

Magneto-rheostatic (MR) materials are fluids that can undergo a significant change in their viscosity in response to a magnetic field. For example, MR fluids can change from a thick and highly viscous fluid to a nearly solid substance within a millisecond when exposed to the magnetic field. The process can be reversed at a similar rate when the magnetic field is removed. Alternatively, electro-rheostatic (ER) materials exhibit similar characteristics when exposed to electric fields. These types of fluids are typically referred to as "smart" fluids.

Figure 10:
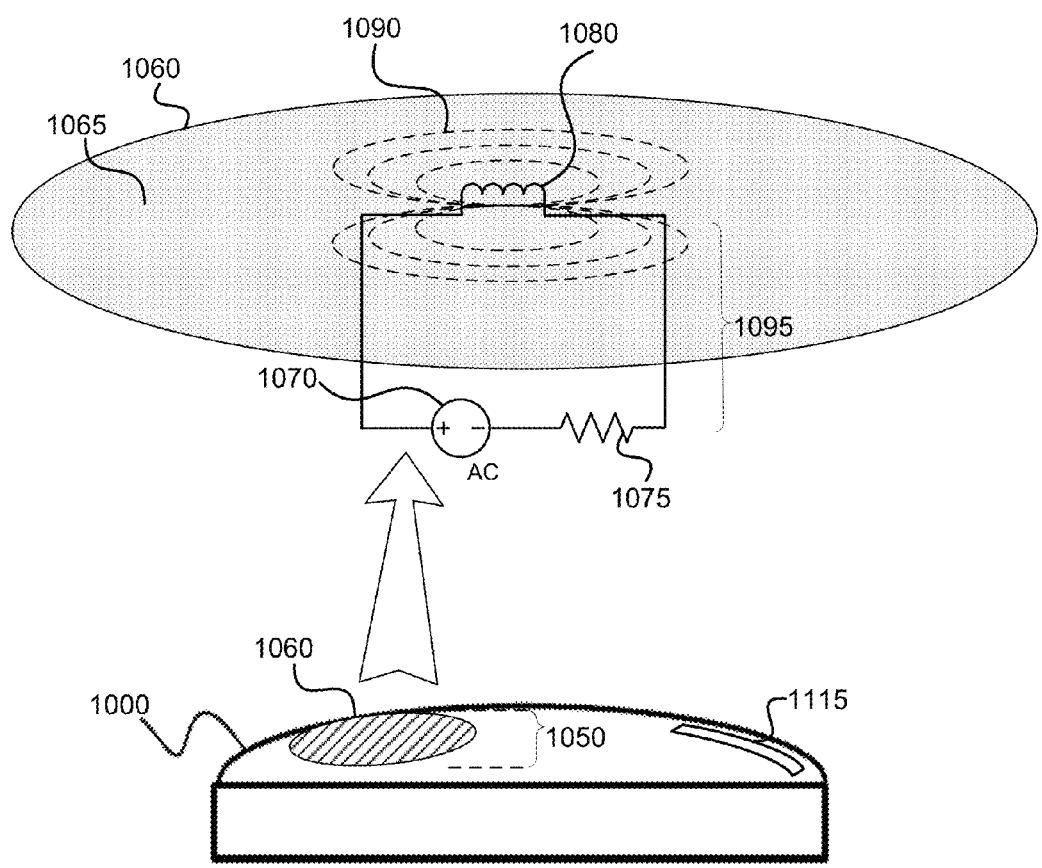
FIG. 10 illustrates a simplified diagram of an input device with a comfortable region comprising an elastic pocket and a magneto-rheostatic fluid disposed therein, according to an embodiment of the invention.

FIG. 10 illustrates a simplified diagram of an input device 1000 with a comfortable region ("Magneto Cell") 1050 comprising an elastic pocket 1060 and a magneto-rheostatic fluid 1065 disposed therein, according to an embodiment of the invention. The magento-rheostatic fluid ("MR fluid") 1065 can change its viscosity in response to a presence of a magnetic field. For example, MR fluid 1065 can become highly viscous in the absence of a magnetic field, making magneto cell 1050 pliable and conformable in response to an applied pressure (e.g., a user's palm resting on magneto cell 1050). In contrast, MR fluid 1065 can become firm and non-pliable (e.g., nearly solid) in the presence of a magnetic field. Thus, a user can customize the contour of magneto cell 1050 with the appropriate use and application of magnetic field 1090.

In certain embodiments, circuit 1095 can be used to create a magnetic field. Circuit 1095 can include an alternating current (AC) power supply 1070, a current limiting component (e.g., a resistor) 1075, and a reactive component 1080 (e.g., inductor). Current limiting component 1075 can be a discrete resistor, an inherent resistance of the power supply, inductor, and/or the conducting lines, or the like. The reactive component 1080 can be an inductor, transformer, or any suitable component that is operable to create a magnetic field 1090 in response to an electric current passing through it. In exemplary embodiments, reactive component 1080 can be a magnetic conductive sponge or a plurality of wires disposed inside elastic pocket 1060. Circuit 1095, or a portion thereof, can be disposed inside or adjacent to elastic pocket 1060 and should be designed such that the magnetic field 1090 extends to all portions of magneto cell 1050. In some embodiments, the operation of circuit 1095 can be controlled by customization control block 220, processor 210, or a combination thereof. Other methods of providing a suitable magnetic field would be appreciated by one of ordinary skill in the art. In some cases, magnetic field 1090 is a passive field.

Although magneto cell 1050 is only shown in one particular position (i.e., the palm region), magneto cell 1050 can used in any desired location of input device 1000. For example, a smaller magneto cell 1050 can be disposed on the side of input device 1000 to accommodate a user's thumb. Magneto cells 1050 can be coupled to any input device, and more generally to any desired surface or location. Furthermore, input device 1000 can be any suitable input device including a computer mouse, remote control, game controller, or the like. Input device 1000 can further include one or more buttons 1115, scroll wheels (not shown), or other suitable functions, which can be controlled by control circuit 210.

It should be appreciated that the embodiments described herein are illustrative and non-limiting. Other variations, implementations, and alternative uses can be used, as would be appreciated by one of ordinary skill in the art with the benefit of this disclosure. For example, some embodiments may utilize a frame or backing portion with elastic pocket 1060. Other embodiments may directly couple elastic pocket 1060 to a surface of input device 1000 by mechanical means, adhesive, or other means. Elastic pocket 1060 (i.e., conformable region) can be implemented in any size, shape, color, or texture. In some cases, the magnetic field may be generated by an external source. In certain embodiments, magnetic field operation can be manually operated by a user (e.g., pressing a button or touch sensor, triggering a pressure sensor, etc.) or automatically controlled by customization control block 220.

Figure 11:
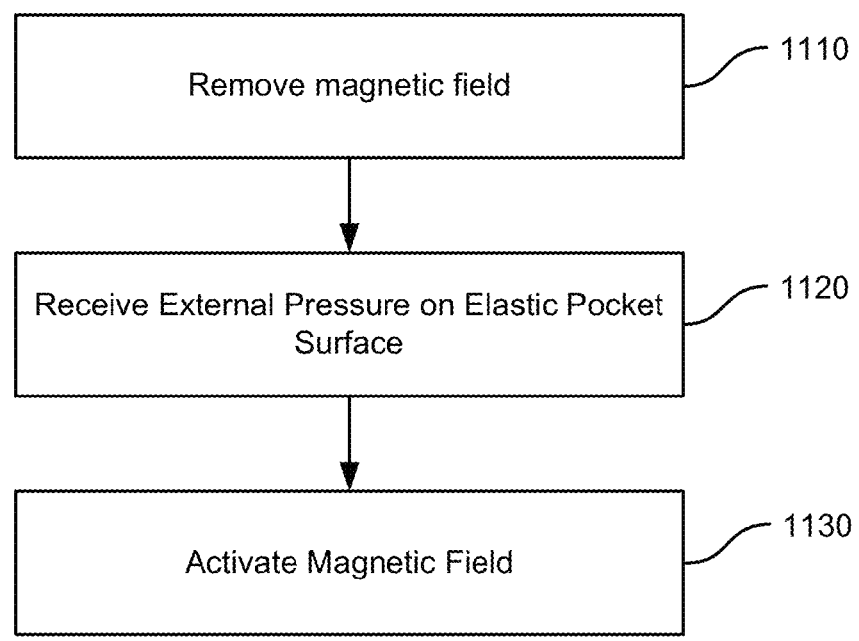
FIG. 11 is a simplified flow diagram illustrating a method for customizing a contour of an input device, according to an embodiment of the invention.

FIG. 11 is a simplified flow diagram illustrating a method 1100 for customizing a contour of an input device, according to an embodiment of the invention. Method 1100 can be performed on input device 1000 to shape the conformable region ("magneto cell") 1050 to a desired contour.

At 1110, method 1100 begins with removing the magnetic field from magneto cell 1050. Magneto cell 1050 becomes highly viscous and conformable in the absence of a magnetic field.

At 1120, elastic pocket 1060 deforms in response to an applied pressure on its surface (e.g., a user's palm). More precisely, as an object applies pressure to elastic pocket 1060, the highly viscous magneto-rheostatic fluid (MR fluid) 1065 contained inside moves around such that the shape of elastic pocket 620 conforms to the shape of the object. This process can be loosely compared to manipulating a gel-filled stress ball or Silly Putty®.

At 1130, method 1100 includes activating the magnetic field 1090. As described above, MR fluid 1065 can become firm and solidified in the presence of magnetic field 1090. In certain embodiments, magnetic field 1090 can be generated by circuit 1095. Alternatively, magnetic field 1090 can be generated by an external source (e.g., third party device).

In certain embodiments, a user is required to apply pressure to elastic pocket 1060 until magnetic field 1090 is applied to magneto cell 1050. In some cases, MR fluid 1065 can be operable to maintain a desired configuration within elastic pocket 1060 (i.e., desired deformation of elastic pocket 1060) prior to applying magnetic field 1060. In other words, a user is not required to continually hold their thumb or palm in a conformable region (i.e., magneto cell 1050) prior to applying magnetic field 1060 because the MR fluid 1065 is viscous (i.e., thick) enough to maintain its shape for a period of time thereafter. Thus, a user can remove magnetic field 1090, make a palm imprint on magneto cell 1050, remove the palm, and then activate magnetic field 1090 shortly thereafter without the risk of any change to the palm imprint due to MR fluid shift. This property may depend on the viscosity of the MR fluid.

It should be appreciated that the specific steps illustrated in FIG. 11 provide a particular method of customizing a contour of an input device, according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 1100.

The software components or functions described in this application (e.g., customization control operations including SMP temperature control, micro-pump control, magnetic field control, locking blade control, etc.) may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network. In a typical case, the software components are embedded code (i.e., firmware) in control circuit 210 or customization control block 220.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An input device comprising:
    a processor;
    a housing including a top side;
    a detachable cover plate to attach to the top side of the housing and to support a user's hand;
    a shape memory polymer (SMP) disposed on the detachable cover plate; and
    a heating element disposed on the SMP and controlled by the processor to control the temperature of the SMP,
    wherein the SMP is pliable and conformable to the user's hand when the processor controls the heating element to raise the temperature of the SMP at or above a threshold value, and
    wherein the SMP is firm and non-conforming to the user's hand when the processor controls the heating element to reduce the temperature of the SMP below the threshold value.

2. The input device of claim 1 wherein the detachable cover plate includes shape memory polymer disposed in areas configured to contact a user's palm and thumb.

3. The input device of claim 1 wherein the input device is a computer mouse.

4. A method for customizing a surface of an input device, the method comprising:
    receiving data, by a processor disposed in the input device, to activate a heating element disposed on a shape memory polymer (SMP) configured on a surface of the input device;
    activating the heating element, by the processor, to heat a temperature of the SMP to at least a threshold temperature in response to receiving the data, wherein the SMP is pliable and conformable to the user's hand when the SMP at or above the threshold value;
    receiving data to deactivate the heating element to cause the temperature of the SMP to drop below the threshold temperature, wherein the SMP is firm and non-conforming to the user's hand when the SMP below the threshold value; and
    deactivating the heating element.

5. The method of claim 4 wherein the received data to activate the heating element is received from a sensor that detects the presence of a user's hand on the surface of the input device.

6. The method of claim 4 wherein the received data to activate the heating element is generated by an activated switch on the surface of the input device.

7. A computer mouse comprising:
    a processor;
    a housing including a top side;
    a shape memory polymer (SMP) disposed on the top side of the housing; and
    a heating element, controlled by the processor and directly coupled to the SMP, to control the temperature of the SMP,
    wherein the SMP is pliable and conformable to the user's hand when the processor controls the heating element to raise the temperature of the SMP at or above a threshold temperature, and
    wherein the SMP is firm and non-conforming to the user's hand when the processor controls the heating element to reduce the temperature of the SMP below the threshold temperature.

8. The computer mouse of claim 7 further comprising a switch coupled to the processor to activate and deactivate the heating element.

9. The computer mouse of claim 7 wherein the SMP is configured on the top side of the housing to contact a user's hand when the computer mouse is in use.

* * * * *